Jan. 15, 1952  J. BOLSEY  2,582,815
INTERCHANGEABLE OBJECTIVE LENS SUPPORTING MEANS
Filed Aug. 10, 1949

INVENTOR.
BY

Patented Jan. 15, 1952

2,582,815

UNITED STATES PATENT OFFICE 2,582,815

INTERCHANGEABLE OBJECTIVE LENS
SUPPORTING MEANS

Jacques Bolsey, New York, N. Y.

Application August 10, 1949, Serial No. 109,538

16 Claims. (Cl. 88—57)

My present invention relates to lens arrangements.

It is an object of my present invention to provide easily interchangeable lens supporting means which permit fastening of the lens to the lens barrel within the camera or projector at any desired distance from the front wall of the apparatus.

It is another object of my present invention to provide novel type of means for easily fastening interchangeable lenses to the lens mount or to an extension tube secured to such lens mount.

With the above objects in view, my present invention mainly consists of a lens arrangement comprising in combination a lens barrel having a front end, an extension tube having a rear end and a front end, a lens member, two fastener means of identical construction, shape and size, one detachably securing the rear end of the extension tube to the front end of the lens barrel, and the other detachably securing the lens member to the front end of the extension tube, and two locating means of identical construction, shape and size, one preventing turning of the extension tube relative to the lens barrel when secured by one of the fastener means to the same, and the other preventing turning of the lens member relative to the extension tube when the lens member is secured by the other of the fastener means to the extension tube.

A particularly preferred extension arrangement according to my present invention includes a lens barrel member having a front end, an extension tube member having a rear end and a front end, first annular extensions, one on the front end of the lens barrel member and one on the rear end of the extension tube member, the first annular extensions forming a first outer and a first inner extension fitting into each other, a first inwardly facing groove in the inner face of the first outer extension, a first outwardly facing groove in the first inner extension forming together with the first inwardly facing groove a first annular space, a first spring ring arranged within the first annular space reaching into both first grooves so as to detachably fasten the extension tube member to the barrel member, a lens member, second annular extensions, one on the front end of the extension tube member and one on the rear face of the lens member, the second annular extensions being identical in shape and arrangement to the first annular extensions and forming a second outer and a second inner extension fitting into each other, a second inwardly facing groove in the inner face of the second outer extension being identical in shape and arrangement to the first inwardly facing groove, a second outwardly facing groove in the second innter extension being identical in shape and arrangement to the first outwardly facing groove and forming together with the second inwardly facing groove a second annular space, a second spring ring being identical in shape and arrangement as the first spring ring and arranged within the second annular space reaching into both second grooves so as to detachably fasten the lens member to the extension tube member, and two locating means being identical in shape and arrangement to each other, each of the locating means including a pin on one of the members and a corresponding groove in the other of the members, one of the locating means arranged between the lens barrel member and the extension tube member, and the other arranged between the extension tube member and the lens member so as to prevent turning of the members relative to each other when fastened to each other by the spring rings.

I wish to note that my present invention might be used also for interchangeably securing a lens to the lens barrel. In this event, the arrangement includes a lens barrel having a front end, a lens member having a rear end, annular extensions, one on the front end of the lens barrel and one on the rear end of the lens member, the annular extensions forming an outer annular extension and an inner annular extension fitting into each other, an inwardly facing groove in the inner face of the outer annular extension, an outwardly facing groove in the inner annular extension forming together with the inwardly facing groove an annular space, a spring ring arranged within the annular space reaching into both grooves so as to detachably fasten the lens member to the lens barrel, and locating means on the lens barrel and the lens member preventing turning of the same relative to each other when fastened to each other by the spring ring.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
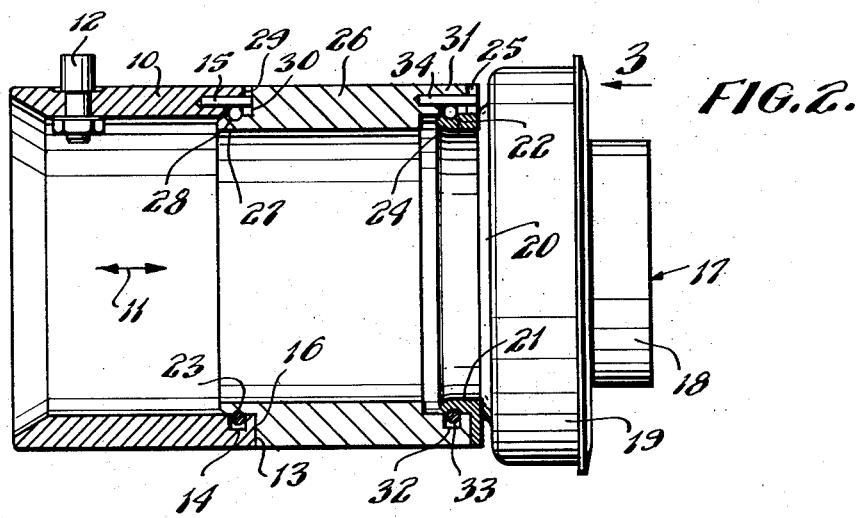
Fig. 2 is a longitudinal section through a lens arrangement including an extension tube in accordance with my present invention.
Figure 1:
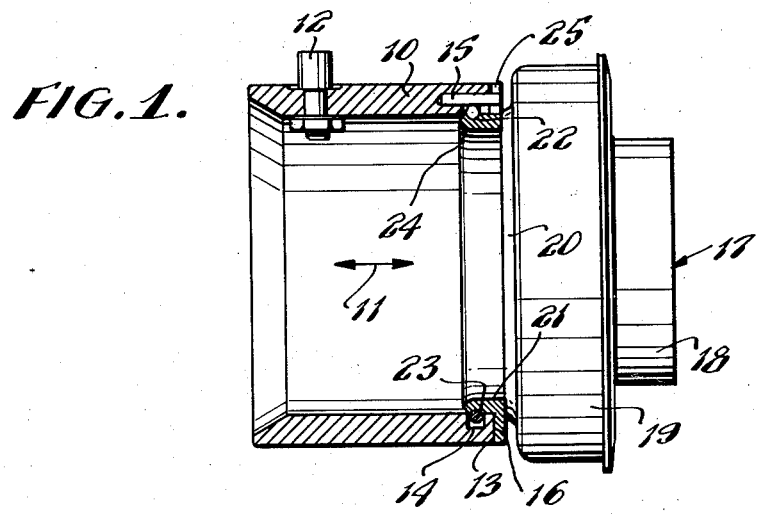
Fig. 1 is a longitudinal section through a lens barrel with an interchangeable lens detachably fastened thereto in accordance with my present invention.
Figure 3:
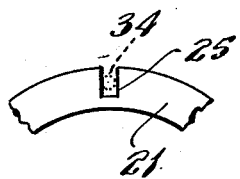
Fig. 3 is a partial side view of the annular extension mounted on the lens unit, seen in direction of arrow 3.

As shown in Figures 1 and 2, the lens barrel 10, which is of conventional type and might be moved in axial direction indicated by arrow 11 by means of pin 12, is provided in its front end portion 13 with an inwardly facing annular groove 14 and a pin 15, projecting beyond the annular front face 16 of the lens barrel.

The lens member 17, which might include besides the lens 18 also a shutter 19, is provided on its rear face 20 with an annular extension 21 having an outer diameter which is identical to the inner diameter of the front end portion 13 of the lens barrel, fitting into the same, as shown in Figure 1.

The annular extension 21 is provided with an outwardly facing groove 22 arranged opposite and corresponding to the inwardly facing groove 14 in the lens barrel 10 when the annular extension 21 is inserted into the front end portion 13 of the lens barrel.

The groove 14 holds a spring ring 23 arranged so as to project beyond the inner face of the lens barrel 10. Furthermore, this spring ring 23 has a diameter which is not greater than the depth of groove 14 so as to be adapted to be forced by the conical end portion 24 of the annular extension 21 on the lens member 17 into the groove 14 when this extension is pushed into the lens barrel 10.

The moment the annular extension 21 reaches its position shown in Figure 1, the spring ring 23 is adapted to contract again and projects in such contracted position into both grooves 14 and 22, preventing sliding of the lens member 17 in axial direction relative to the lens barrel 10.

In order to prevent turning of the lens member 17 about its axis, I provide in the annular extension 21 a slot 25 into which projects the locating pin 15, as shown.

It is evident that in order to insert the interchangeable lens member into the lens barrel, it is only necessary to push it against action of the spring ring 23, into the position shown in Figure 1. Removal of the lens member is attained by slight tilting of the entire lens unit relative to the lens barrel, which results in disengagement of the spring ring 23. After such disengagement, the lens member can be removed by sliding in axial direction.

When it is desired not only to exchange the lens member but also to be able to mount it at different distances, I use my new extension arrangement shown in Figure 2.

In this arrangement, the lens barrel 10 and the lens member 17 are shaped and constructed in the same manner as for the arrangement shown in Figure 1.

The only difference is that in addition to these two members, I provide an extension tube 26 which is provided at its rear end with fastening means adapted to engage the fastening means at the front end of the lens barrel 10, and is provided at its front end with fastening means adapted to engage the fastening means provided on the annular extension 21 of the lens member 17.

This extension tube 26 carries at its rear end an annular extension 27 having the same outer diameter as the annular extension 21 of the lens member 17 and fitting into the front end portion 13 of the lens barrel 10. This annular extension 27 is provided with an outwardly facing annular groove 28 having the same shape and size as groove 22 in the annular extension 21 of the lens member 17.

Furthermore, I provide in the rear end face 29 of the extension tube 26 a locating groove 30 which is identical in shape and arrangement to the locating groove 25 provided in the annular extension 21 of lens member 17.

It is evident that by these means it is possible to fasten the extension tube 26 to the lens barrel 10 in the same manner as described above in connection with fastening of the lens member 17 to the lens barrel.

Furthermore, I provide at the front end of the extension tube 26 an outer annular extension 31 having an inner diameter which is identical to the inner diameter of the front end portion 13 of the lens barrel 10 so that the annular extension 21 of the lens member 17 fits into this extension. In the inner face of this extension 31, a groove 32 is provided which is identical in shape and arrangement to the groove 14 provided in lens barrel 10. In this groove, I mount a spring ring 33 which is identical in shape to the spring ring 23 described above.

Furthermore, I provide in the front face of the annular extension a locating pin 34 which is identical in shape and arrangement to the locating pin 15 provided in the front face 16 of the lens barrel 10.

By these means, it is possible to fasten the extension tube to the lens member 17 in the same manner as described above in connection with fastening of the lens member to the lens barrel 10.

I wish to stress that if desired, I might use not only one extension tube but several extension tubes of equal or different lengths fastened to each other. In this event, I attach the rearmost of the thus connected extension tubes to the lens barrel and the foremost to the lens member.

It will be understood that each of the elements described above, or two or more together, may also find a useful application in other types of photographic or cinematographic apparatus, differing from the types described above.

While I have illustrated and described the invention as embodied in cameras, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A lens arrangement comprising in combination a lens barrel member; an extension member; first fastening means detachably fastening the rear end of said extension tube member to the front end of said lens barrel member and including first spring means on one of said members and first grooves on the other of said members adapted to engage said first spring means and rotatably fasten said members to each other; first locating means arranged between said lens barrel member and said extension member preventing rotation of the same relative to each other when detachably fastened to each other by said first fastening means; a lens member; second fastening means being identical in construction and arrangement to said first fastening means serving for detachably fastening said lens member to the front end of said extension tube member and including second spring means on one of said members and second grooves on the other of said members adapted to engage said second spring means and rotatably fasten said members to each other; and second locating means being identical in construction and arrangement to said first locating means and arranged between said lens member and said extension member preventing rotation of the same relative to each other when detachably fastened to each other by said second fastening means.

2. A lens arrangement comprising in combination a lens barrel member; an extension member; first fastening means detachably fastening the rear end of said extension tube member to the front end of said lens barrel member and including one annular groove in one of said members, one corresponding annular groove in the other of said members forming together with said first mentioned annular groove an annular space, and a spring ring fitting into said annular space reaching into both annular grooves so as to detachably fasten said members to each other; a lens member; and second fastening means for detachably fastening said lens member to the front end of said extension tube member and including one annular groove in one of said members, one corresponding annular groove in the other of said members forming together with said first mentioned annular groove an annular space and a spring ring fitting into said annular space reaching into both annular grooves so as to detachably fasten said members to each other.

3. A lens arrangement comprising in combination a lens barrel member; an extension member; first fastening means detachably fastening the rear end of said extension tube member to the front end of said lens barrel member and including one annular groove in one of said members, one corresponding annular groove in the other of said members forming together with said first mentioned annular groove an annular space, and a spring ring fitting into said annular space reaching into both annular grooves so as to detachably fasten said members to each other; first locating means on said lens barrel member and said extension tube member cooperating with each other so as to prevent turning of the same relative to each other when detachably fastened to each other by said first fastening means; a lens member; second fastening means for detachably fastening said lens member to the front end of said extension tube member and including one annular groove in one of said members, one corresponding annular groove in the other of said members forming together with said first mentioned annular groove an annular space and a spring ring fitting into said annular grooves so as to detachably fasten said members to each other; and second locating means on said extension tube member and said lens member cooperating with each other so as to prevent turning of the same relative to each other when detachably fastened to each other by said second fastening means.

4. A lens arrangement comprising in combination a lens barrel member; an extension member; first fastening means detachably fastening the rear end of said extension tube member to the front end of said lens barrel member and including one annular groove in one of said members, one corresponding annular groove in the other of said members forming together with said first mentioned annular groove an annular space, and a spring ring fitting into said annular space reaching into both annular grooves so as to detachably fasten said members to each other; first locating pin and groove means on said lens barrel member and said extension tube member cooperating with each other so as to prevent turning of the same relative to each other when detachably fastened to each other by said first fastening means; a lens member; second fastening means for detachably fastening said lens member to the front end of said extension tube member and including one annular groove in one of said members, one corresponding annular groove in the other of said members forming together with said first mentioned annular groove an annular space and a spring ring fitting into said annular space reaching into both annular grooves so as to detachably fasten said members to each other; and second locating pin and groove means on said extension tube member and said lens member cooperating with each other so as to prevent turning of the same relative to each other when detachably fastened to each other by said second fastening means.

5. A lens arrangement comprising in combination a lens barrel member having a front end; an extension tube member having a rear end and a front end; first annular extensions, one on the front end of said lens barrel member and one on the rear end of said extension tube member, said first annular extensions forming a first outer and a first inner extension fitting into each other; a first inwardly facing groove in the inner face of said first outer extension; a first outwardly facing groove in said first inner extension forming together with said first inwardly facing groove a first annular space; a first spring ring arranged within said first annular space reaching into both said first grooves so as to detachably fasten said extension tube member to said barrel member; a lens member; second annular extensions, one on the front end of said extension tube member and one on the rear face of said lens member, said second annular extensions forming a second outer and a second inner extension fitting into each other; a second inwardly facing groove in the inner face of said second outer extension; a second outwardly facing groove in said second inner extension forming together with said second inwardly facing groove a second annular space; and a second spring ring arranged within said second annular space reaching into both second grooves so as to detachably fasten said lens member to said extension tube member.

6. A lens arrangement comprising in combination a lens barrel member having a front end; an extension tube member having a rear end and a front end; first annular extensions, one on the front end of said lens barrel member and one on the rear end of said extension tube member, said first annular extensions forming a first outer and a first inner extension fitting into each other; a first inwardly facing groove in the inner face of said first outer extension; a first outwardly facing groove in said first inner extension forming together with said first inwardly facing groove a first annular space; a first spring ring arranged within said first annular space reaching into both said first grooves so as to detachably fasten said extension tube member to said barrel member; a lens member; second annular extensions, one on the front end of said extension tube member and one on the rear face of said lens member, said second annular extensions being identical in shape and arrangement to said first annular extensions and forming a second outer and a second inner extension fitting into each other; a second inwardly facing groove in the inner face of said second outer extension being identical in shape and arrangement to said first inwardly facing groove; a second outwardly facing groove in said second inner extension being identical in shape and arrangement to said first outwardly facing groove and forming together with said second inwardly facing groove a second annular space; and a second spring ring being identical in shape and arrangement to said first spring ring and arranged within said second annular space reaching into both second grooves so as to detachably fasten said lens member to said extension tube member.

7. A lens arrangement comprising in combination a lens barrel member having a front end; an extension tube member having a rear end and a front end; first annular extensions, one on the front end of said lens barrel member and one on the rear end of said extension tube member, said first annular extensions forming a first outer and a first inner extension fitting into each other; a first inwardly facing groove in the inner face of said first outer extension; a first outwardly facing groove in said first inner extension forming together with said first inwardly facing grove a first annular space; a first spring ring arranged within said first annular space reaching into both said first grooves so as to detachably fasten said extension tube member to said barrel member; a lens member; second annular extensions, one on the front end of said extension tube member and one on the rear face of said lens member, said second annular extensions being identical in shape and arrangement to said first annular extensions and forming a second outer and a second inner extension fitting into each other; a second inwardly facing groove in the inner face of said second outer extension being identical in shape and arrangement to said first inwardly facing groove; a second outwardly facing groove in said second inner extension being identical in shape and arrangement to said first outwardly facing groove and forming together with said second inwardly facing groove a second annular space; a second spring ring being identical in shape and arrangement to said first spring ring and arranged within said second annular space reaching into both second grooves so as to detachably fasten said lens member to said extension tube member; and two locating means being identical in shape and arrangement to each other, one of said locating means arranged between said lens barrel member and said extension tube member, and the other arranged between said extension tube member and said lens member so as to prevent turning of said members relative to each other when fastened to each other by said spring rings.

8. A lens arrangement comprising in combination a lens barrel member having a front end; an extension tube member having a rear end and a front end; first annular extensions, one on the front end of said lens barrel member and one on the rear end of said extension tube member, said first annular extensions forming a first outer and a first inner extension fitting into each other; a first inwardly facing groove in the inner face of said first outer extension; a first outwardly facing groove in said first inner extension forming together with said first inwardly facing groove a first annular space; a first spring ring arranged within said first annular space reaching into both said first grooves so as to detachably fasten said extension tube member to said barrel member; a lens member; second annular extensions, one on the front end of said extension tube member and one on the rear face of said lens member, said second annular extensions being identical in shape and arrangement to said first annular extensions and forming a second outer and a second inner extension fitting into each other; a second inwardly facing groove in the inner face of said second outer extension being identical in shape and arrangement to said first inwardly facing groove; a second outwardly facing groove in said second inner extension being identical in shape and arrangement to said first outwardly facing groove and forming together with said second inwardly facing groove a second annular space; a second spring ring being identical in shape and arrangement to said first spring ring and arranged within said second annular space reaching into both second grooves so as to detachably fasten said lens member to said extension tube member; and two locating means being identical in shape and arrangement to each other, each of said locating means including a pin on one of said members and a corresponding groove in the other of said members, one of said locating means arranged between said lens barrel member and said extension tube member, and the other arranged between said extension tube member and said lens member so as to prevent turning of said members relative to each other when fastened to each other by said spring rings.

9. A lens arrangement comprising in combination a lens barrel having a front end; an extension tube having a rear end and a front end; a lens member; two first fastener means, one arranged on the front end of said lens barrel and the other arranged on the front end of said extension tube; and two complementary second fastener means, one arranged on the rear end of said extension tube and the other arranged on said lens member and each of said second fastener means constructed for cooperation with any one of said first fastener means, thereby enabling either direct attachment of said lens member to said lens barrel or attachment of said lens member to said lens barrel with said extension tube interposed between said lens barrel and lens member.

10. A lens arrangement comprising in combination a lens barrel having a front end; an extension tube having a rear end and a front end; a lens member; two first fastener means of identical construction, shape and size, one arranged on the front end of said lens barrel and the other arranged on the front end of said extension tube; and two complementary second fastener means of identical construction, shape and size, one arranged on the rear end of said extension tube and the other arranged on said lens member and each of said second fastener means thus adapted to cooperate with any one of said first fastener means, thereby enabling either direct attachment of said lens member to said lens barrel or attachment of said lens member to said lens barrel with said extension tube interposed between said lens barrel and lens member.

11. A lens arrangement comprising in combination a lens barrel having a front end; an extension tube having a rear end and a front end; a lens member; two first fastener means, one arranged on the front end of said lens barrel and the other arranged on the front end of said extension tube; two complementary second fastener means, one arranged on the rear end of said extension tube and the other arranged on said lens member and each of said second fastener means constructed for cooperation with any one of said first fastener means, thereby enabling either direct attachment of said lens member to said lens barrel or attachment of said lens member to said lens barrel with said extension tube interposed between said lens barrel and lens member; and two locating means of identical construction, shape and size, one preventing turning of said extension tube relative to said lens barrel when attached to said lens barrel by the first fastener means arranged on the front end of said lens barrel and the complementary second fastener means arranged on the rear end of said extension tube, and the other preventing turning of said lens member relative to said extension tube when attached to said extension tube by the first fastener means arranged on the front end on said extension tube and the complementary second fastener means arranged on said lens member.

12. A lens arrangement comprising in combination a lens barrel having a front end; an extension tube having a rear end and a front end; a lens member; two first catch fastener means, one arranged on the front end of said lens barrel and the other arranged on the front end of said extension tube; and two complementary second spring fastener means, one arranged on the rear end of said extension tube and the other arranged on said lens member and each of said second spring fastener means constructed for cooperation with any one of said first catch fastener means, thereby enabling either direct attachment of said lens member to said lens barrel or attachment of said lens member to said lens barrel with said extension tube interposed between said lens barrel and said lens member.

13. A lens arrangement comprising in combination a lens barrel having a front end; an extension tube having a rear end and a front end; a lens member; two first catch fastener means of identical construction, shape and size, one arranged on the front end of said lens barrel and the other arranged on the front end of said extension tube; and two complementary second spring fastener means of identical construction, shape and size, one arranged on the rear end of said extension tube and the other arranged on said lens member and each of said second spring fastener means constructed for cooperation with any one of said first catch fastener means, thereby enabling either direct attachment of said lens member to said lens barrel or attachment of said lens member to said lens barrel with said extension tube interposed between said lens barrel and said lens member.

14. A lens arrangement comprising in combination a lens barrel having a front end; an extension tube having a rear end and a front end; a lens member; two first catch fastener means of identical construction, shape and size, one arranged on the front end of said lens barrel and the other arranged on the front end of said extension tube; two complementary second spring fastener means of identical construction, shape and size, one arranged on the rear end of said extension tube and the other arranged on said lens member and each of said second spring fastener means constructed for cooperation with any one of said first catch fastener means, thereby enabling either direct attachment of said lens member to said lens barrel or attachment of said lens member to said lens barrel with said extension tube interposed between said lens barrel and said lens member; and two locating means of identical construction, shape and size, one preventing turning of said extension tube relative to said lens barrel when attached to said lens barrel by the first catch fastener means arranged on the front end of said lens barrel and the complementary second spring fastener means arranged on the rear end of said extension tube, and the other preventing turning of said lens member relative to said extension tube when attached to said extension tube by the first catch fastener means arranged on the front end on said extension tube and the complementary second catch fastener means arranged on said lens member.

15. A lens arrangement comprising in combination a lens barrel having a front end; an extension tube having a rear end a front end; a lens member; and two fastener arrangements, each composed of a first and a second complementary fastener means one of which is a catch fastener means and the other of which is a spring fastener means constructed for cooperation with any one of said catch fastener means, said first fastener means arranged on the front ends of said lens barrel and said extension tube and said second complementary fastener means arranged on said lens member and the rear end of said extension tube, thereby enabling either direct attachment of said lens member to said lens barrel or attachment of said lens member to said lens barrel with said extension tube interposed between said lens barrel and said lens member.

16. A lens arrangement comprising in combination a lens barrel having a front end; an extension tube having a rear end and a front end; a lens member; two fastener arrangements, each composed of a first and a second complementary fastener means one of which is a catch fastener means and the other of which is a spring fastener means constructed for cooperation with any one of said catch fastener means, said first fastener means arranged on the front ends of said lens barrel and said extension tube and said second complementary fastener means arranged on said lens member and the rear end of said extension tube, thereby enabling either direct attachment of said lens member to said lens barrel or attachment of said lens member to said lens barrel with said extension tube interposed between said lens barrel and said lens member; and two locating means, one preventing turning of said extension tube relative to said lens barrel when attached to said lens barrel by one of said fastener arrangements and the other preventing turning of said lens member relative to said extension tube when attached to said extension tube by the other of said fastener arrangements.

JACQUES BOLSEY.

REFERENCES CITED

The following references are of record in the file of this patent:

UNITED STATES PATENTS

| Number | Name | Date |
|---|---|---|
| 1,818,024 | Wittel | Aug. 11, 1931 |
| 2,268,341 | Nerwin | Dec. 30, 1941 |
| 2,352,844 | Loebe | July 4, 1944 |
| 2,426,521 | Parker | Aug. 26, 1947 |
| 2,472,307 | Nagel | June 7, 1949 |
| 2,497,147 | Washam | Feb. 14, 1950 |

FOREIGN PATENTS

| Number | Country | Date |
|---|---|---|
| 385,905 | Germany | Dec. 12, 1923 |
| 258,866 | Switzerland | June 1, 1949 |